(12) United States Patent
Arnaboldi et al.

(10) Patent No.: US 12,613,848 B2
(45) Date of Patent: Apr. 28, 2026

(54) PARALLEL CONSTRUCTION ALGORITHM FOR IN-MEMORY HIERARCHICAL NAVIGABLE SMALL WORLD VECTOR INDEX IN A RELATIONAL DATABASE MANAGEMENT SYSTEM

(71) Applicant: Oracle International Corporation, Redwood Shores, CA (US)

(72) Inventors: Marco Arnaboldi, Zurich (CH); Ioannis Alagiannis, Zurich (CH); Martin Brugnara, Zurich (CH); Laurent Phillipe Daynes, Saint-Ismier (FR); Damien Hilloulin, Zurich (CH); Vlad Ioan Haprian, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/038,504

(22) Filed: Jan. 27, 2025

(65) Prior Publication Data

US 2025/0335410 A1 Oct. 30, 2025

Related U.S. Application Data

(60) Provisional application No. 63/640,593, filed on Apr. 30, 2024.

(51) Int. Cl.
*G06F 16/22* (2019.01)

(52) U.S. Cl.
CPC ...... *G06F 16/2237* (2019.01); *G06F 16/2246* (2019.01)

(58) Field of Classification Search
CPC ......................... G06F 16/2237; G06F 16/2246
USPC .......................................................... 707/797
See application file for complete search history.

(56) References Cited

FOREIGN PATENT DOCUMENTS

| | | | | | |
|---|---|---|---|---|---|
| CN | 116150304 | A | * | 5/2023 | .......... G06F 16/322 |
| CN | 116521966 | A | * | 8/2023 | .......... G06F 16/951 |
| CN | 116821440 | A | * | 9/2023 | |
| CN | 117689451 | A | * | 3/2024 | ......... G06F 16/9535 |
| CN | 119903217 | A | * | 4/2025 | ......... G06F 16/9024 |

OTHER PUBLICATIONS

Malkov et al., "Efficient and Robust Approximate Nearest Neighbor Search Using Hierarchical Navigable Small World Graphs", retrieved: Jan. 28, 2025, 11 pages, available: https://dl.acm.org/doi/10.1109/TPAMI.2018.2889473.

* cited by examiner

*Primary Examiner* — Giovanna B Colan
(74) *Attorney, Agent, or Firm* — Hickman Becker Bingham Ledesma LLP

(57) ABSTRACT

The present disclosure relates to efficiently constructing in-memory HNSW vector indexes in a database management system (DBMS). A DBMS may store in memory a segmented array, wherein the segmented array may store representations of a plurality of vectors from a database. A hierarchical navigable small world (HNSW) vector index may be constructed in the memory, wherein the HNSW vector index may index the plurality of vectors. A similarity search may be performed using the HNSW vector index.

20 Claims, 11 Drawing Sheets

PARALLEL CONSTRUCTION ALGORITHM FOR IN-MEMORY HIERARCHICAL NAVIGABLE SMALL WORLD VECTOR INDEX IN A RELATIONAL DATABASE MANAGEMENT SYSTEM

CROSS-REFERENCE TO RELATED APPLICATIONS

This application claims the benefit of U.S. Provisional Application No. 63/640,593, filed Apr. 30, 2024, which is incorporated herein by reference in its entirety.

TECHNICAL FIELD

The present disclosure relates to indexes for performing approximate similarity searches over vector data.

BACKGROUND

In data science, similarity search often appears in the natural language processing (NLP) domain, in search engines, and in recommender systems in which relevant documents or other items are retrieved for a query. Demand is growing for methods to perform similarity search on data that resides in relational databases. Previous solutions have used vector databases constructed outside a database storing data of interest, such as a relational database. For example, vector indexes can be constructed in dedicated similarity search engines. As another example, data can be migrated to a vector database.

These solutions, however, substantially increase the complexity of data management and lead to significant loading and data transfer costs for external engines. Further, these solutions are not practical in the presence of data manipulation language (DML) statements like insertions and deletions that are common in enterprise environments.

Relational databases can be extended with new data types such as the VECTOR data type, with SQL operators that enable the creation of vectors over existing or new database tables, or with similarity search capabilities. But without special support, performance of the similarity search will be worse than the performance offered by dedicated vector engines. In particular, a main-memory vector index allowing fast navigation through vectors significantly increases performance.

Hierarchical navigable small world (HNSW) can be used for an approximate similarity search. HNSW has proven to yield the highest performance in terms of recall and query per second (QPS) metrics. The recall metric represents the number of correct results that are returned from a top-k similarity search; a recall of 1 means that all the results are "true positives", while a recall of 0 means that all the results are "false positives". A top-k similarity search is a search for the k most similar vectors in a dataset to a query vector. A top-k approximate similarity search may reduce the recall metric of a top-k similarity search to some degree—meaning that the k results of such a search may not be, in fact, the k most similar vectors—in exchange for reducing the cost of the search. Similarity may be expressed using a distance function between vectors in a vector space such as, for example, Euclidean distance or cosine distance.

Similarity vector engines can use graph indexes stored in main memory to speed up similarity search workloads. One example is RDBMSs with vector analytics features, which include databases built on top of an entity-relationship model. This kind of RDBMS allows both in-memory features to speed up queries and some graph supports. Another example is vector processing libraries including vector engines that work outside of data stores—meaning that vector data is exported and transferred from the RDBMS to the vector engine system. An HNSW index may be constructed in external memory. Different loaders can be used to construct the HNSW index depending on the vector engine and the format in which the vector data is exported. An additional example is vector database systems, which include systems specifically optimized to map, store, and explore vector datasets. Data can be directly created, stored, and managed in the vector database.

It would be desirable to construct a main-memory HNSW vector index relying on existing database features. It would likewise be desirable to perform construction of the HNSW vector index as fast as possible to make if fresh and usable in industry scenarios. For example, it would be desirable to efficiently construct an HNSW index from relational data while maintaining high recall and high QPS. As another example, it would be desirable to seamlessly integrate construction of the HNSW index with existing, optimized features of RDBMSs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present disclosure relates to efficiently constructing in-memory HNSW vector indexes in a DBMS, including an RDBMS. The techniques described herein enable approximate similarity search with high recall and high QPS. These techniques construct a main-memory HNSW vector index by exploiting parallelism mechanisms provided by the RDBMS—thereby minimizing, and even eliminating, synchronization between workers.

An HNSW vector index may be structured as a multi-layer graph. Each layer of the graph may include one or more vertices that are connected by edges in various possible configurations. The layers of the graph may be arranged hierarchically. Layers in the graph may be indexed by contiguous integers starting from zero, where layer 0 is the lowest layer. The vertices in higher layers of the graph may have fewer connections, while the lower layers may have comparatively more connections among vertices. Layer zero may include all vectors in a dataset. Each layer above layer 0 may include a portion of the vectors from the layer immediately below. That is, if a vector is present in a particular layer, then it will also be present in any lower layers.

Constructing an HNSW vector index may entail two phases, data ingestion and index construction. During the data ingestion phase, vectors residing in tables stored in disk are read and stored in a main memory vector storage. The index construction phase entails inserting vectors into a graph to construct the HNSW vector index.

Vector Database System Overview

Figure 1:
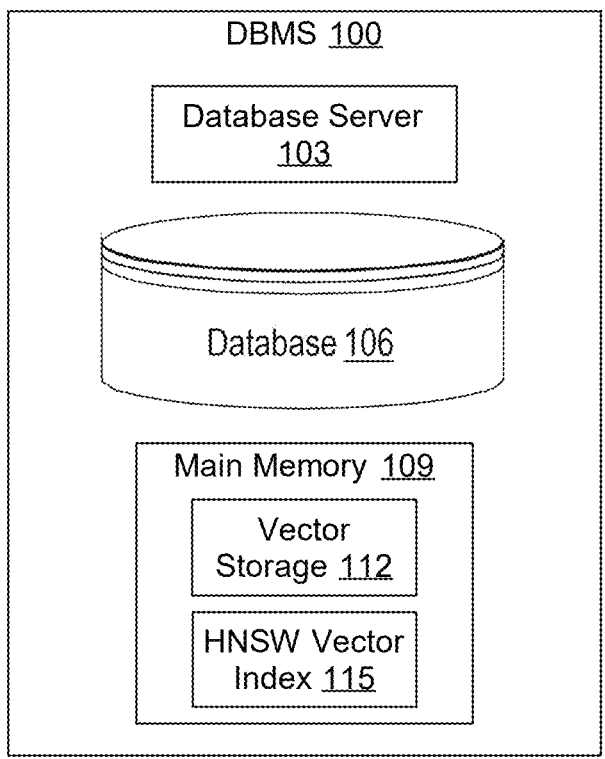
FIG. 1 is a block diagram that depicts an example database management system (DBMS), in an embodiment.

FIG. 1 is a block diagram that depicts an example database management system (DBMS) 100, in an embodiment. DBMS 100 comprises a database server 103 and a database 106. Database server 103 is communicatively coupled to database 106. DBMS 100 may be deployed in a network of an enterprise or may be deployed in a cloud environment and, therefore, may be accessible to an enterprise over one or more computer networks (e.g., the Internet). DBMS 100 may be provisioned for an enterprise by a cloud management team of a cloud provider as needed on an enterprise-by-enterprise basis.

Database server 103 comprises one or more computing machines, each executing one or more compute instances that receive and process data requests, including data retrieval requests (e.g., queries) and data modification requests (i.e., for vector data modifications), such as inserting vectors, deleting vectors, and updating vectors. Database 106 may comprise multiple storage devices, each storing data potentially including vector data. A computing instance translates a data request into a storage layer request that the computing instance transmits to database 106. A computing machine that hosts at least one compute instance includes (1) one or more processors, (2) volatile memory for storing data requests (and their respective contents) and vector data and non-vector data that is retrieved from database 106, and (3) optionally, non-volatile memory.

Main memory 109 may comprise volatile, random-access memory accessible to the DBMS 100. Main memory 109 may store vector storage 112 and an HNSW vector index 115. The vector storage 112 may comprise a segmented array that stores one or more vectors from the database 106 and their associated metadata. The HNSW vector index 115 may comprise a multi-layer graph that indexes vector from the vector storage 112. Both the vector storage 112 and the HNSW vector index 115 are discussed in greater detail below.

Efficient Main Memory Vector Storage

Vectors and their metadata (e.g., ROWIDs, which identify the location of vectors on disk) may be stored in records allocated from a per-index slab allocator that is built on top of a memory manager provided by the DBMS 100. A vector may be accessed using a pointer to its associated record that is stored in a segmented array that comprises the vector storage 112. The vector store segmented array may therefore provide a way to index vectors using an identifier. This identifier is the vector identifier ("VID"), which may indicate the position of a vector in the vector storage 112.

Figure 2:
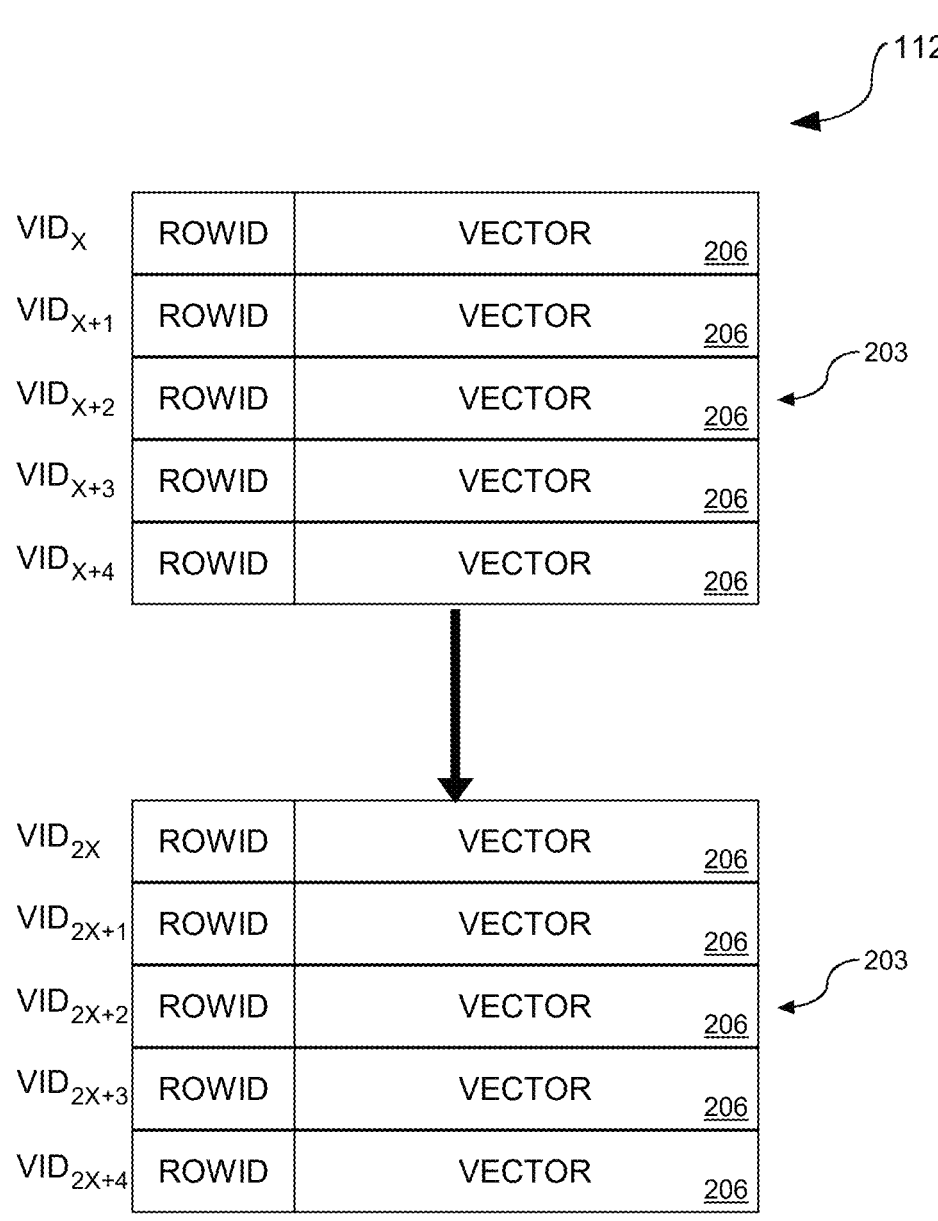
FIG. 2 shows an example of main memory vector storage, in an embodiment.

FIG. 2 shows an example of main memory vector storage 112, in an embodiment. Segments 203 of fixed size may be allocated from the DBMS 100 memory manager. Vectors and their metadata may be stored in those segments 203. Because the segments 203 are fixed-size, a vector may be retrieved given its VID. If the size of a vector and its metadata are known, then it is possible to determine the number of elements 206 per segment 203—that is, how many vectors can fit into one segment 203. The size of elements 206 is given by sizeOf(ROWID)+sizeOf(VEC-TOR). The elements 206 per segment 203 is given by sizeOf(segment)/sizeOf (element). With simple division and modulo operations, it is possible to identify a segment 203 and a vector address within the segment 203. VIDs may therefore be quickly and efficiently translated into ROWIDs. Translation of ROWIDs to VIDs may be implemented using a table that is stored on disk.

HNSW Vector Index

The HNSW vector index 115 is a multi-layer, in-memory graph. Each layer of the graph comprises vertices, each vertex corresponding to a vector. The lowest layer of the graph contains vertices of all of the vectors in the indexed data set. Higher layers of the HNSW vector index 115 have a decaying fraction of the vertices in the layer below.

Various hyperparameters may be used in HNSW vector index 115 construction. For example, the hyperparameter M, referred to as the "neighbor count", is the number of neighbors that each vertex is connected to on each layer. Vectors in layer 0 (the lowest layer) may have double that number of neighbors (e.g., 2M neighbors). In each layer, vertices are connected to their approximate M closest neighbors using edges that are used to walk the graph. At the lowest layer ("layer 0"), the number of neighbors of each vertex may be different than the number of neighbors of each vertex at higher layers, such as 2M. The vertices at higher layers are on average much farther from each other (relative to lower layers) and, therefore, allow traversal of long distances.

A probability distribution function may be defined based on M to determine whether a vertex is to be inserted in a layer that is above the lowest layer. The probability distribution function is such that probabilities decay with higher layers. When the probability drops below 1e-9, then no more layers are added. An example probability distribution function is $$p\,(\text{Layer}) = \frac{1 - \frac{1}{M}}{M^{Layer}}$$

For example, regarding hyperparameter R, when a new vertex (corresponding to a new vector) is inserted into an HNSW vector index, a random number R between [0.0, 1.0] is generated. A new vertex is always inserted into layer 0. A new vertex is inserted into higher layers up to a layer i if:

$$R = p(i-1) + p(i-2) + ... + p(0)$$

In an example, with M=10, if R=0.991, then the new vertex is inserted in layers 0 and 1. Any suitable promotion strategy may be used, however. As another example, the dataset may be pre-process to find k-medoids, and those may be promoted in upper layers.

An HNSW hyperparameter that is used for construction is referred to as "efConstruction" and refers to the number of vertices to consider within a layer when looking for the closest M vertices (or closest 2M vertices in layer 0) to which to connect a new vertex. Larger values for this parameter improve index quality but slow down construction. An example value for this parameter is 2M (or 4M for layer 0).

An HNSW hyperparameter that is used in searching is referred to as "efSearch" and refers to the number of vertices to remember in each layer when searching for the K nearest neighbors in a top-K search. Larger values of this parameter improve search quality but slow down searches. An example value for this parameter is 2K (or double the number of desired K matches).

To perform a similarity search using the HNSW vector index 115 given a query vector, a search process may start from the highest layer of the graph. The search process may proceed to the next layer of the graph each time a nearest neighboring node to the query vector is greedily found in the current layer. The nearest neighbor in a layer may be used as an entry point to the layer immediately below. The nearest neighboring node that is found in the lowest layer of the graph then becomes the result of the similarity search.

The number of operations to find the nearest neighboring node in a given layer may be bounded by a constant. Considering that the number of layers in a graph is logarithmic, the total computational complexity of the search process may be O(log n).

HNSW Vector Index Sizing

HNSW may best be used if the HNSW vector index 115 fits in the memory of one server or computing device. The size of the HNSW vector index 115 may be dominated by layer 0—higher layers decline rapidly. Layer 0 may include a vertex for each indexed vector and two VIDs for each edge connecting two vertices. Each VID may comprise four bytes.

For N vectors of size S with M neighbors each, the index size may be computed as follows:

Index Size =

Total Size of Vectors + Total Size of Edge Metadata = $N(S + 8\ M)$

The following table shows sample index sizes for an HNSW vector index 115 that is based on one hundred million vectors.

| Dimension Type | # of Dimensions | # of Neighbors | Index Size (GiB) |
| --- | --- | --- | --- |
| float | 512 | 16 | 203 |
| float | 512 | 32 | 215 |
| float | 512 | 64 | 239 |
| double | 512 | 16 | 393 |
| double | 512 | 32 | 405 |
| double | 512 | 64 | 429 |
| float | 1024 | 16 | 394 |
| float | 1024 | 32 | 406 |
| float | 1024 | 64 | 430 |
| double | 1024 | 16 | 775 |
| double | 1024 | 32 | 787 |
| double | 1024 | 64 | 811 |
| float | 2048 | 16 | 775 |
| float | 2048 | 32 | 787 |
| float | 2048 | 64 | 811 |
| double | 2048 | 16 | 1538 |
| double | 2048 | 32 | 1550 |
| double | 2018 | 64 | 1574 |

Thus, for a server with two terabytes of memory, the maximum number of vectors with float dimension type that the server can store are approximately one billion vectors (of 512 dimensions each, each vector with 32 neighbors), five hundred million vectors (of 1024 dimensions each, each vector with 32 neighbors), and two hundred and fifty million vectors (of 2048 dimensions each, each vector with 32 neighbors). For double dimension type, the server can store a maximum of approximately five hundred million vectors (of 512 dimensions each, each vector with 32 neighbors), two hundred and fifty million vectors (of 1024 dimensions each, each vector with 32 neighbors), and one hundred and twenty-five million vectors (of 2048 dimensions each, each vector with 32 neighbors).

Process for Parallel HNSW Vector Index Construction

Figure 3:
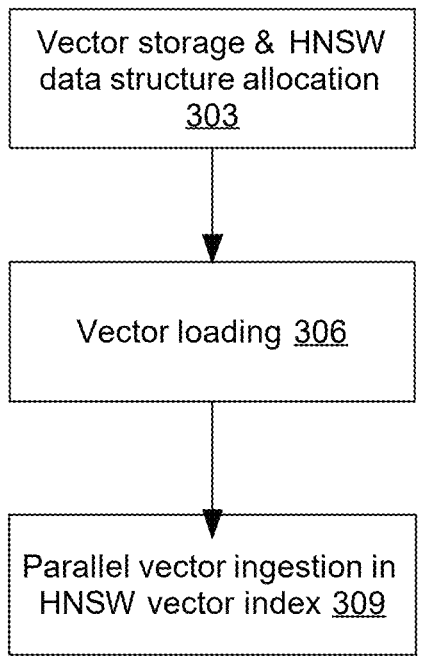
FIG. 3 is a flow diagram that illustrates an example of a process for parallel HNSW vector index construction, in an embodiment.

FIG. 3 is a flow diagram that illustrates an example of a process for parallel HNSW vector index 115 construction, in an embodiment. The flow diagram of FIG. 3 provides merely an example of the many different types of functional arrangements that may be employed to implement the depicted process.

At step 303, the main memory vector storage 112 and the graph data structures that will make up the HNSW vector index 115 are allocated. The vector storage 112 is allocated from a per-index slab allocator that is built on top of a memory manager provided by the DBMS 100. The multi-layer graph is created from these graph data structures, each of which represents a layer in the graph. An exponentially decaying probability distribution, which is discussed in more detail above, is used to determine how many layers are in the graph, how many vectors are in each layer, and to which layer each vector is assigned (i.e., the highest layer in which the vector can be found)

At step 306, the vectors and their metadata are loaded into the main memory vector storage 112. Stored inside the vector storage 112 is, for each segment of the vector storage 112 segmented array, a representation of an individual vector and metadata, such as a ROWID that identifies the location of that vector on disk. Vectors and ROWIDs are read from disk.

At step 309, the vectors are ingested into the HNSW vector index 115. Vectors from the main memory vector storage 112 are inserted into the graph data structures for each layer of the HNSW graph, first sequentially and then in parallel.

Process for Vector Ingestion in HNSW Index

Figure 4A:
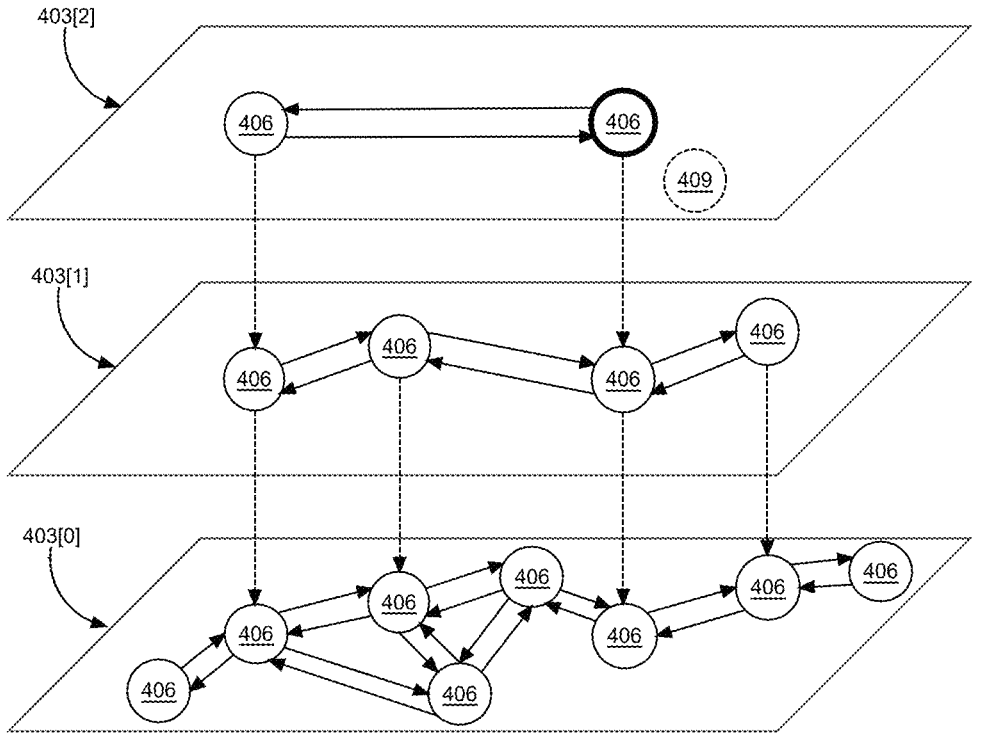
FIGS. 4A-4C illustrate an example of a process for vector ingestion in an HNSW vector index 115, in an embodiment.
Figure 4B:
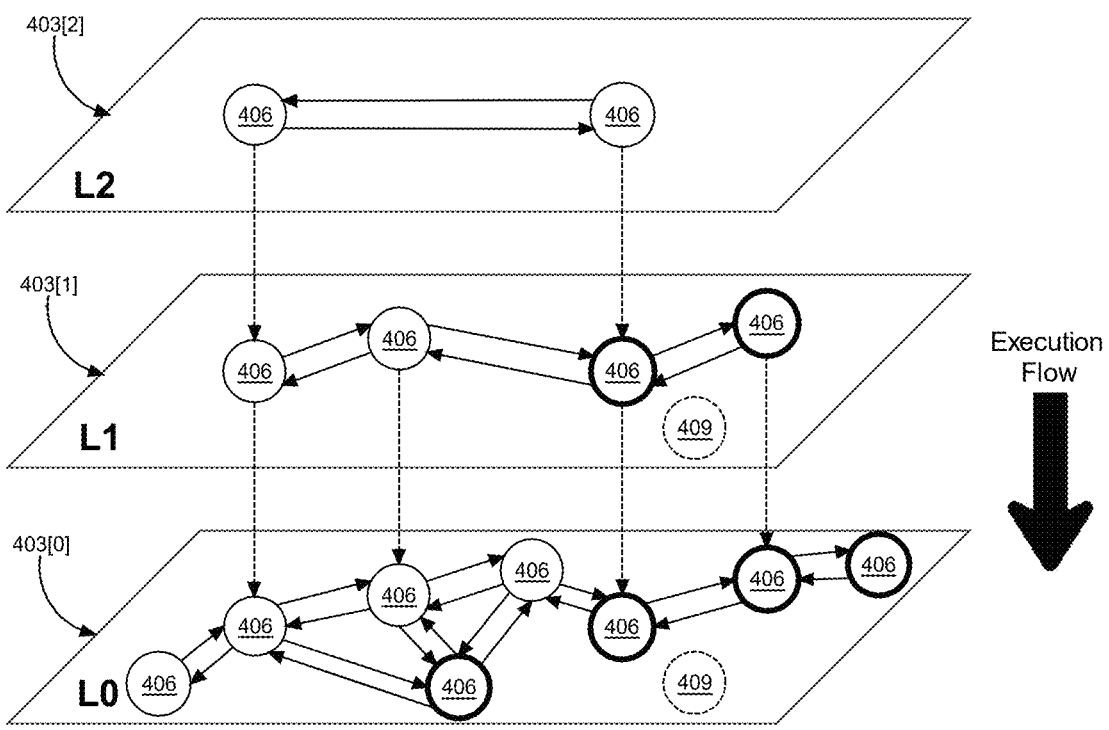
Figure 4C:
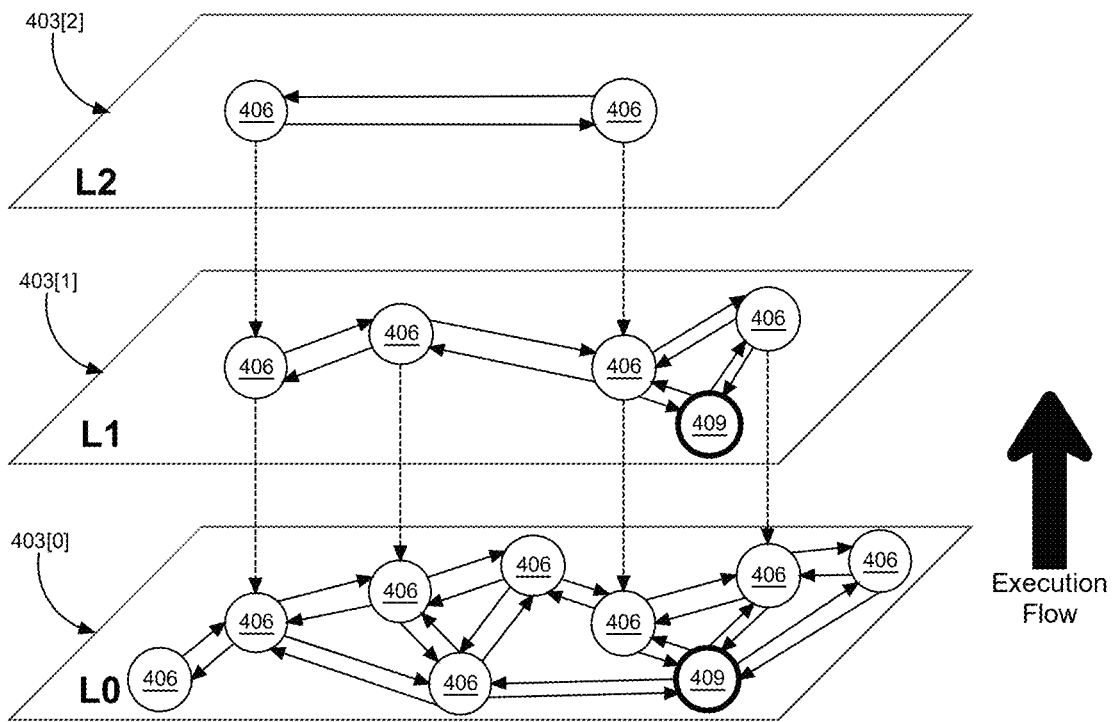

FIGS. 4A-4C illustrate an example of a process for vector ingestion in an HNSW vector index 115, in an embodiment. This example includes a multilayer graph 400 comprising a plurality of layers 403, with each layer 403 comprising one or more vectors 406. There are three layers 403 in this example graph 400, each indexed from 0-2 with index [0] corresponding to the lowest layer 403 and index [2] corresponding to the highest layer 403 of the graph 400—namely, layers 403[0], 403[1], and 403[2]. The process takes as input a new vector 409, the vector's VID, and its vector level I.

When ingested into the graph 400, each vector 406 may be randomly assigned an integer I the represents the new vector's 409 vector level, or the highest layer 403 in which the new vector 409 may be inserted. The value of I for each vector 406 may be selected randomly based on an exponentially decaying probability distribution normalized by a non-zero multiplier mL. In some examples, the majority of I values may be equal to zero so that most vectors 406 are present only in layer 403[0]. Larger values for mL may increase the probability of a vector 406 appearing in higher layers 403 of the graph 400.

In this example, the new vector 409 is assigned a vector level and a VID using the probability distribution. Assuming that I=1 for the new vector 409, then the new vector 409 may only be inserted in layer 403[0] and layer 403[1]. Ingestion of the new vector 409 into the graph 400 may then proceed in three stages: Greedy Search, Neighbor Selection, and Insertion.

FIG. 4A illustrates an example of the Greedy Search stage. During Greedy Search, a 1-NN search (a k-NN search is a search for the k nearest neighbors of a vector) may be performed until reaching layer 403[1], which is the layer 403 of the graph 400 to which the new vector 409 belongs. Greedy Search may start from the highest layer 403 of the graph 400 and greedily search for the nearest vector 406 in that layer 403 to the new vector 409. The nearest vector 406 may be used as an entry point to the next layer 403 (that is, the highest layer in the graph below the current layer). This process continues until it reaches the layer 403[1].

In this example, a vector 406 in layer 403[2] is identified as the nearest vector 406 to the new vector 409. The identified vector 406 is used as an entry point to layer 403[1], which is layer 403[1] for the new vector 409.

FIG. 4B illustrates an example of the Neighbor Selection stage. During Neighbor Selection, a neighbor list for the new vector 409 is identified in layer 403[1] and each lower layer 403 of the graph 400. An efConstruction-NN greedy search may be executed starting from layer 403[1] to find a number of nearest neighbor vectors 406 equal to the value of the efConstruction hyperparameter. If the number of candidate neighbor vectors 406 exceeds the neighbor count hyperparameter M, then a pruning heuristic may be applied to select the best M neighbor vectors 406, which is discussed in greater detail below. This process may be repeated at each layer that is below layer 403[1] until reaching layer 403[0], with each of the efConstruction neighbor vectors 406 acting as an entry point to each layer 403. The neighbor list for each layer 403 may be stored in a cache in a temporary data structure.

In this example, assuming M=2, two vectors 406 in layer 403[1] are selected as neighbors for the new vector 409. Then, proceeding to layer 403[0], 4 vectors 406 are selected as neighbors to the new vector 409 because M is doubled in the lowest layer 403.

FIG. 4C illustrates an example of the Insertion stage. The new vector 409 may be inserted into layer 403[1] and any layers 403 below layer 403[1]. The insertion process begins at layer 403[0] and proceeds upwards until it reaches layer 403[I]. At each layer 403, insertion comprises two sub-steps. First, the new vector 409 is inserted into the current layer 403, and edges are created between the new vector 409 and its selected neighbor vectors 406 in the current layer 403. Second, "backward" edges are created from each of these selected neighbor vectors 406 to the new vector 409. These two sub-steps may be repeated at layers 403 above the lowest layer 403[0] until the two sub-steps have been performed in layer 403[I].

In this example, the new vector 409 is inserted into layer 403[0], and edges are created from the new vector 409 to the four selected neighbor vectors 406 in layer 403[0]. Backward edges are then created from the four selected neighbor vectors 406 to the new vector 409. Then, in layer 403[1], the new vector 409 is inserted, edges are created from the new vector 409 to its two neighbor vectors 406, and backwards edges are created from the two neighbor vectors 406 to the new vector 409.

Pruning Neighbor Lists

If creating a backwards edge to a new vector would exceed the maximum number of neighbors M for a particular vector that neighbors the new vector, a pruning heuristic may be applied to find the best M candidate neighbors. The pruning heuristic may be based on, for example, the distances of particular vector's neighbors from the particular vector. The pruning heuristic may attempt to achieve better connectivity across the graph using these distances by retaining both long and short edges. Short edges allow for navigation within the cluster of vectors close to the particular vector. Long edges, on the other hand, allow for easier exploration of other portions of the graph. Using the pruning heuristic, neighbors of the particular vector are ranked based on their distances, with shorter distances ranked higher than longer distances. Any suitable heuristic may be used, however. The top M neighbors in this ranking are then selected to be the new neighbors of the particular vector, and the particular vector's neighbor list is updated accordingly.

Efficient HNSW Graph Representation

The HNSW vector index 115 may be implemented as a collection of graph data structures (one such structure for each layer of the HNSW vector index 115) that together make up a multi-layer graph. Each of these graph data structures may be shaped at allocation time by allocating an exact number of neighbor lists—based on the number of vectors to be indexed—and by allocating a size of the neighbor lists—the upper bound of which is given by M.

In some implementations, each layer of the multi-layer graph may be represented in main memory using compressed sparse row (CSR) representation, for instance. CSR representation may be a compact representation of a sparse connection matrix in two arrays, a source array and a destination array. Vertices in the graph may be indexed by contiguous integers starting from zero. For each source vertex in the graph, the destination array may comprise indices for the source vertex's neighboring vertices, ordered by the index of the source vertex. Each element of the source array corresponds to a VID that is associated with a particular vector—e.g., each index of the source array is equal to the value of the particular vector's VID. The source array may comprise, at index i, a size of the neighbor list of source vector i. Because neighbor lists of size M are pre-allocated, the location of the beginning of a vector's neighbor list may be calculated by multiplying the vector's VID by M.

In some implementations, however, instead of a CSR representation, each layer of the graph may be stored using an optimized graph representation. Like CSR, the optimized graph representation may comprise a source array and a destination array. But instead of the source array storing an offset to the location of a corresponding neighbor list in memory, the source array may store a pointer to the neighbor list. Unlike CSR representation, the destination array need not be contiguous in memory. The source array may be pre-allocated given the number of vectors in a layer. The same number of neighbor lists of size M may also be pre-allocated for the destination array. Without the need to update the source array as in CSR representation, the optimized graph representation allows threads and processes to work independently without expensive synchronization, thereby enabling lock-free index construction.

The destination array may or may not be contiguous in memory depending on the memory manager provided by the DBMS 100. If the DBMS 100 memory manager can provide contiguous memory for the destination array, the source array storing pointers to positions in the destination array still avoids the resolution of offsets. If the DBMS 100 memory manager can provide segmented memory for the destination array, storing pointers avoids the even costlier offset resolution that would otherwise come with segmented memory. In the case of a slab-allocator on top of the DBMS 100 memory manager as discussed above, neighbor lists of size M may be slab allocated from a memory pool, which introduces further benefits in transactional consistency.

Inserting a New Vector in HNSW Graph Representation

Figure 5A:
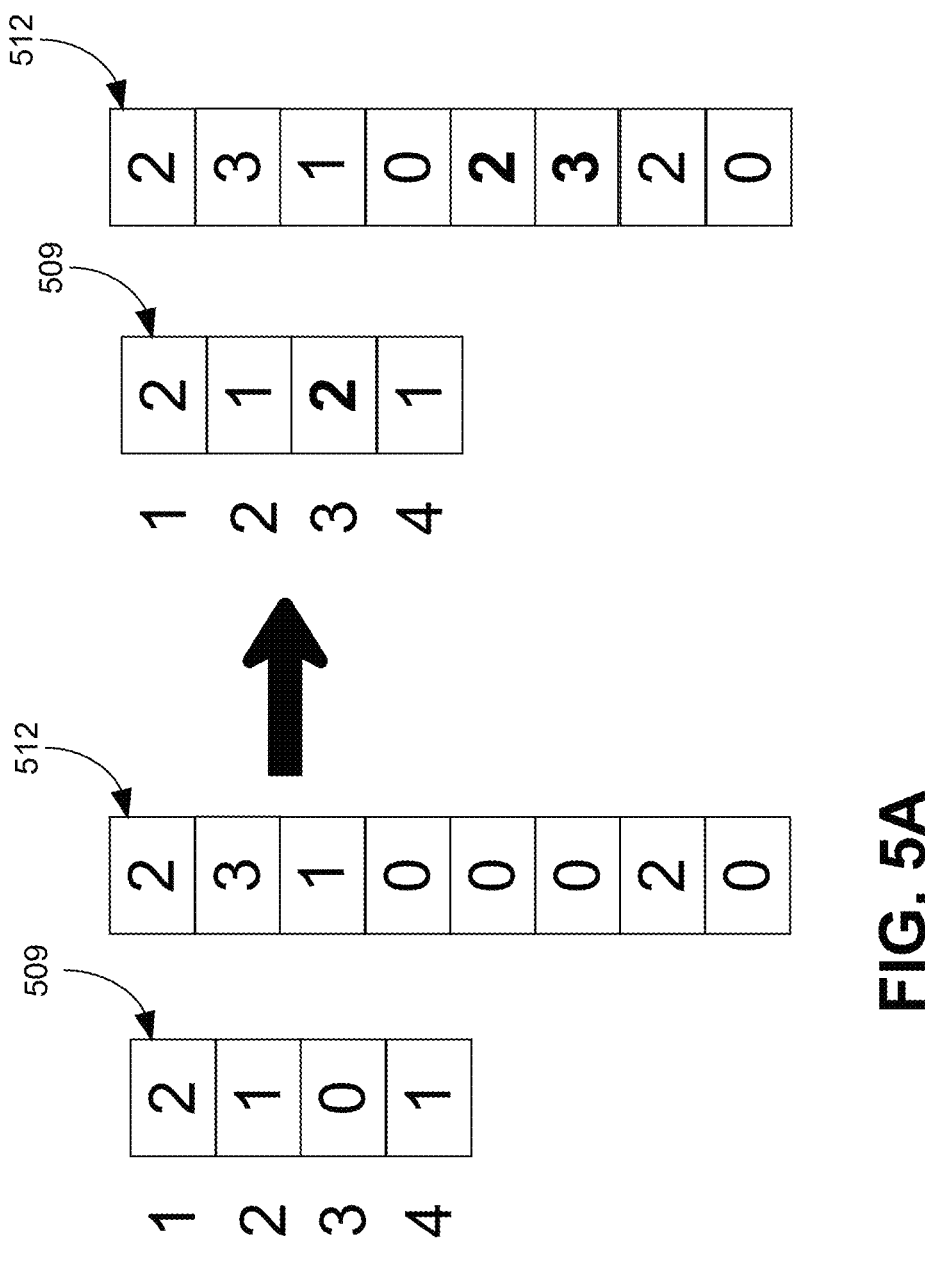
FIGS. 5A-5B illustrate an example of a process for inserting a new vector's vector identifier and neighbor list into a graph data structure representing one layer of a multi-layer graph in an HNSW vector index, in an embodiment.
Figure 5A:
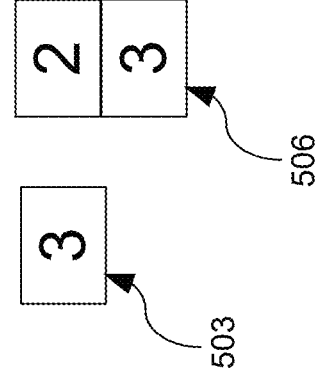
Figure 5B:
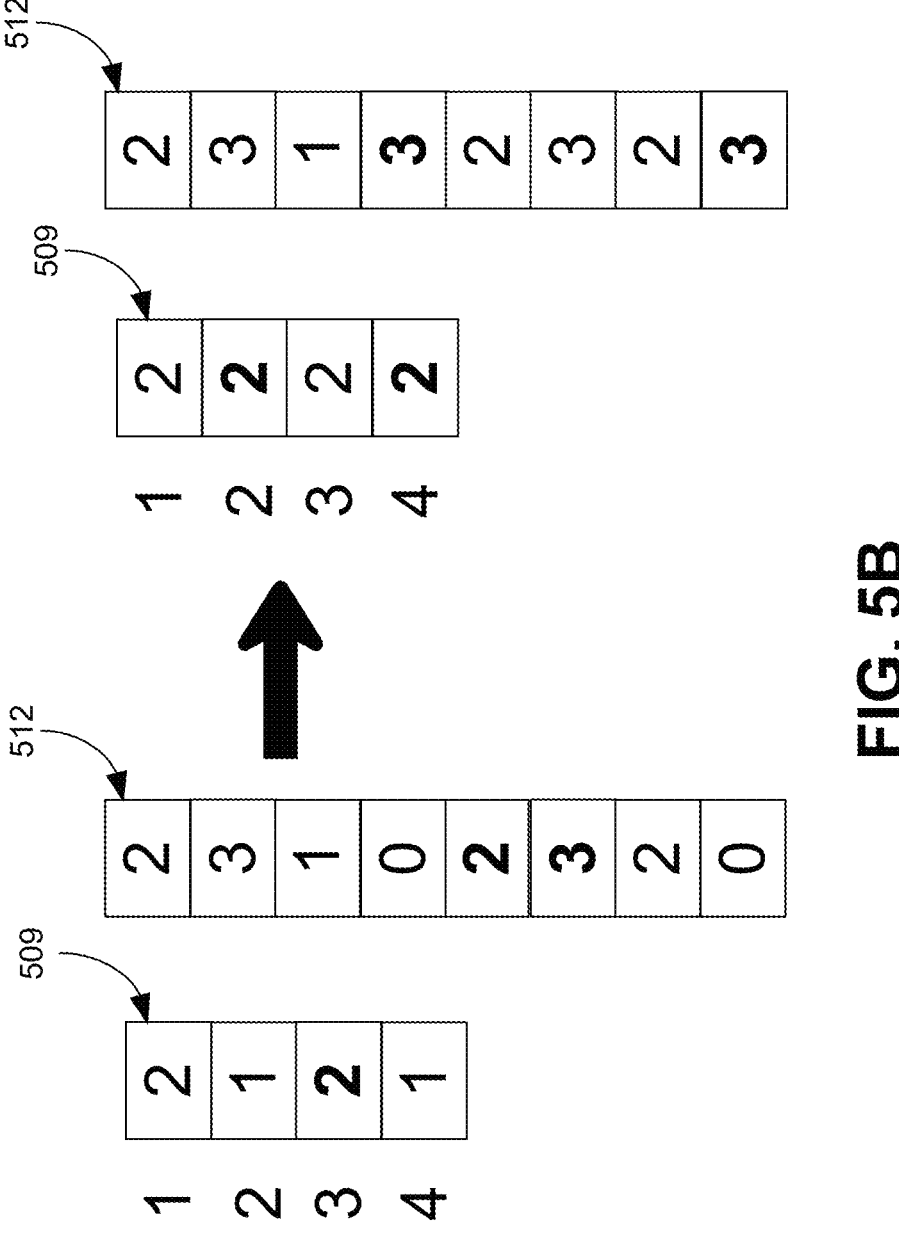

FIGS. 5A-5B illustrate an example of a process for inserting a new vector's VID 503 and neighbor list 506 into a graph data structure representing one layer of a multi-layer graph in an HNSW vector index 115, in an embodiment. The graph data structure comprises a source array 509 and a destination array 512. In the examples of FIGS. 5A-5B, the source array 509 is depicted as storing the sizes of each vector's neighbor list as in the CSR representation discussed above. In some examples, though, the source array 509 may instead store pointers to the destination array 512 as in the optimized graph representation discussed above.

Insertion of the new vector may be performed from the lowest layer of the graph up to layer I. For purposes of illustration, each element of the source array 509 in this example is depicted as storing the size of the associated vector's neighbor list. However, each element of the source array may instead store a pointer to a corresponding neighbor list that is represented in the destination array 512. In that case, the size of a neighbor list may be determined because the neighbor list either terminates with a value of "0" or is full (it has M elements). The destination array 512 stores neighbor lists for the source vertices represented in the source array 509.

Inserting a new vector into a graph data structure may be performed in two steps. First, the new vector's VID 503 and its neighbor list 506 may be inserted into the graph. Because neighbor lists of size M are pre-allocated, the start position for insertion of the neighbor list 506 in the destination array 512 may be computed as VID*M, where VID is the vector identifier of the new vector. Assuming that M=2, the destination array 512 includes a maximum of eight neighbors for the four source vectors represented in the source array 509. When the new vector is inserted into the graph, the size of the new vector's neighbor list 506 is inserted into the source array 509 at an element corresponding to the new vector's VID 503. In this case, because the new vector's VID 503 is "3", the size of the neighbor list 506, "2", is inserted into the source array 509 at index 3. Or, when using the optimized graph representation, a pointer to the start of the new vector's neighbor list in memory may be inserted instead. The neighbor list 506 is copied to the destination array 512 from a local cache, where it was stored during Neighbor Selection. The new vector is thereby connected by edges to its neighbors.

Second, the new vector is inserted into the neighbor list of each of the new vector's neighbors. The source array 509 is updated to reflect the increased size of the neighbor lists associated with the new vector's neighbors. Because the vectors having VIDs of "2" and "4" now have one additional neighbor—the new vector, having a VID of "3"—indices 2 and 4 of the source array 509 are both set to a value of "2". If using the optimized graph representation, however, the source array 509 need not be updated since it stores pointers to these two vectors' neighbor lists. Likewise, the neighbor lists for those two vectors are updated in the destination array 512 to reflect that they now have a neighbor with a VID of "3". If doing so would cause any of these neighbor lists to have a size that exceeds M, however, a pruning heuristic may be used to select the best M neighbors, as discussed above. The new vector's neighbors are thereby connected by backwards edges to the new vector.

Process for Neighbor List Iteration

Figure 6:
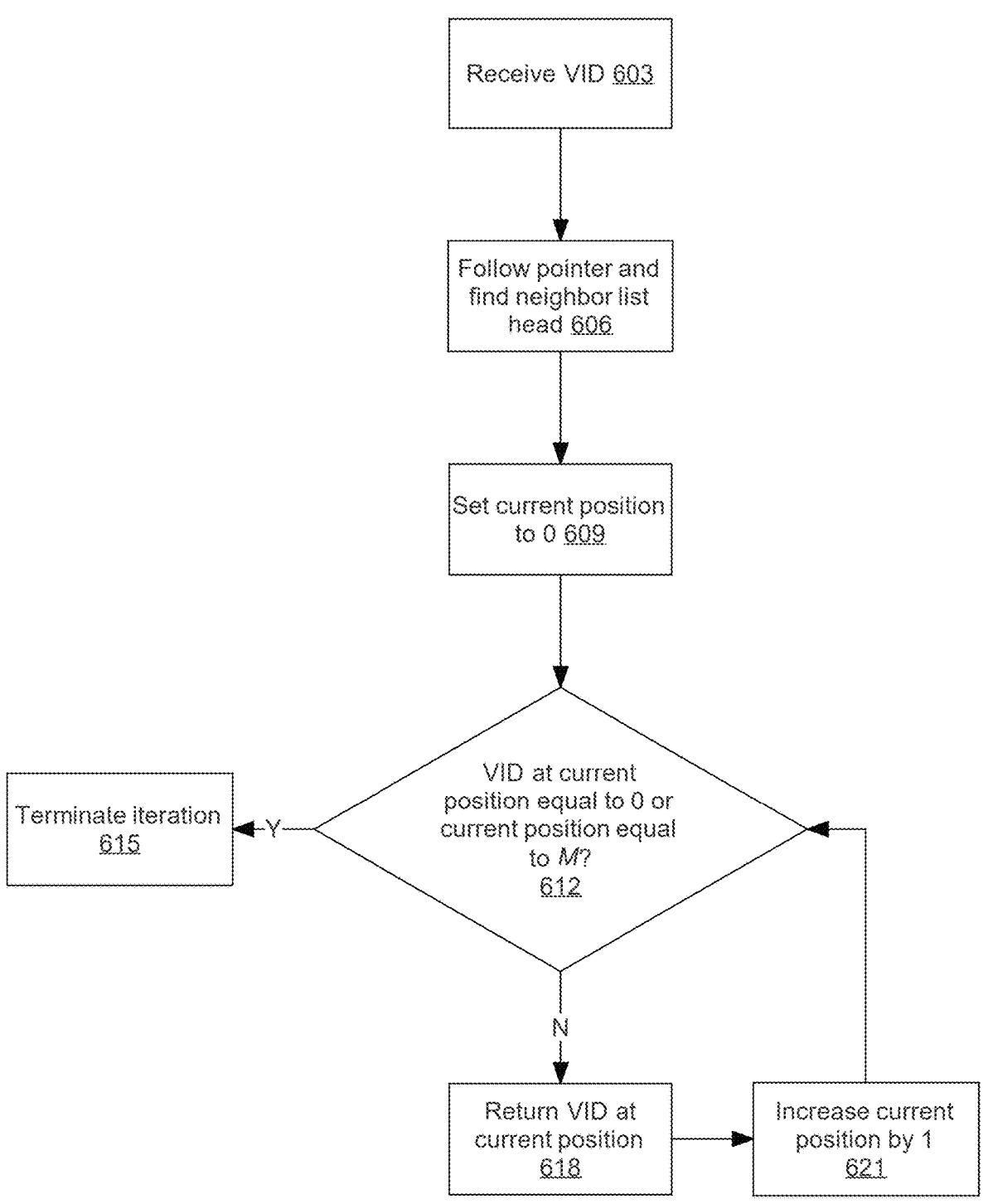
FIG. 6 is a flow diagram that depicts an example of a process for performing an iteration of a neighbor list of a particular vector, in an embodiment.

FIG. 6 is a flow diagram that depicts an example of a process for performing an iteration of a neighbor list of a particular vector, in an embodiment. This process may be used to iterate over neighbor lists that are represented using the optimized graph representation. An iterator may execute this process when as a part of a read or insertion operation involving a neighbor list. The flow diagram of FIG. 6 provides merely an example of the many different types of functional arrangements that may be employed to implement the operation of the depicted process.

At step 603, the iterator receives a VID. The VID identifies a vector that is indexed by the HNSW vector index.

At step 606, the iterator follows a pointer stored in the source array at a position corresponding to the VID. The pointer leads to the head of the vector's neighbor list.

At step 609, the iterator sets a current position of the iteration to 0. The current position represents an internal counter corresponding to the position of the iteration in the neighbor list.

At step 612, the iterator determines whether (a) the VID located at the current position is equal to zero, or (b) the current position is equal to M. Each of these two conditions represents a termination condition for the iteration. The current position being equal to M is a termination condition because it means that the iteration has reached the end of the neighbor list. The iterator uses a VID of 0, which is an invalid VID, as a termination condition in case the neighbor list has a number of elements that is fewer than M—thereby avoiding any locking issue. If either of these conditions is true, then the process proceeds to step 615. Otherwise, the process proceeds to step 618.

At step 615, the iterator terminates the current iteration of the vector's neighbor list.

At step 618, the iterator returns the VID at the current position.

At step 621, the iterator increases the current position by 1. The process then proceeds back to step 612.

Parallelization

The vector ingestion process may be optimized by exploiting parallelization capabilities of the DBMS 100. During the vector ingestion process, VID sequences may be evenly split across a plurality of workers given a Degree of Parallelism provided by the user. Each worker may execute the vector ingestion process on its own subset of the vector IDs. Splitting may ensure that each worker performs vector ingestion process on one vector.

Execution may proceed without issue when all workers are in either the Greedy Search stage or the Neighbor Selection stage. Race conditions involving the destination array may occur, however, when any of the workers is executing the Insertion stage—and in particular, when inserting a new vector in the neighbor list of the new vector's neighbors. Consider several examples involving a first worker and a second worker.

The first worker is reading a neighbor list of a vector during the greedy search stage. The second worker is writing to the neighbor list of that vector during the Insertion stage. If the first worker reads the vector's neighbor list before the second worker has finished writing to the neighbor list, the first worker could read an invalid value.

The first worker is reading a vector's neighbor list during the Neighbor Selection stage. The second worker is writing to the neighbor list of that vector during the Insertion stage. If the first worker reads the vector's neighbor list before the second worker has finished writing to the neighbor list, the first worker could read an invalid value.

A first vector and a second vector share a neighboring vector. The first worker is updating the neighboring vector's neighbor list to include the first vector. The second worker is updating the neighboring vector's neighbor list to include the second vector. The second worker could completely or partially overwrite what the first worker is doing.

These examples show that the point of contention is the neighbor list.

These race conditions may be mitigated in different ways depending on what stages of the vector ingestion process that the workers are in. When a worker is executing the Insertion stage concurrently with another worker executing the Greedy Search stage or the Neighbor Selection stage, race conditions may be mitigated using a lock-free mechanism. For example, a particular vector's neighbor list may be iterated over, not based on the size of the neighbor list, but until encountering a termination value such as a vector ID value of "0" (or, if no vector ID value of "0" is encountered, until iteration reaches the maximum number of neighbors M). When reading a neighbor list, the read operation may terminate when a vector ID value of "0" is encountered. When writing to a neighbor list, the write operation may be performed at the index of the neighbor list with a vector ID value of "0". when both workers are executing the Insertion stage but neither is performing pruning.

When multiple workers are in the Insertion stage and performing pruning, however, a locking mechanism could instead be used. In the lock-based solution, backward edge creation may be performed using whatever locking mechanism is provided by the DBMS 100. A number of locks sufficient to protect all of the neighbor lists may be allocated. By using $10DOP^2$ locks, waiting time on the locks may be significantly reduced, where DOP is the Degree of Parallelism.

In some implementations, a lock-free mechanism may be used when multiple workers are performing pruning during the Insertion stage. In the lock-free solution, complete and partial overwrites of the neighbor list are allowed during backward edge creation. The additional randomness created by these overwrites does not affect the quality of the HNSW vector index 115 in terms of construction time, recall, and QPS.

Initial Sequential Ingestion

Before parallel ingestion begins, N vectors may be sequentially inserted into the graph. N may represent a configurable system parameter. Like parallel ingestion, the initial sequential ingestion may be performed using the processes described with respect to FIGS. 4A-4C and FIGS. 5A-5B. This initial sequential insertion may be performed to have a better-connected graph. Starting with parallel ingestion may result in navigable small world properties not being respected because of poorly-connected top layers. The poor connection of the top layers may propagate to lower layers, resulting in disconnected regions in the lower layers of the graph, which may impact search latency and recall.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
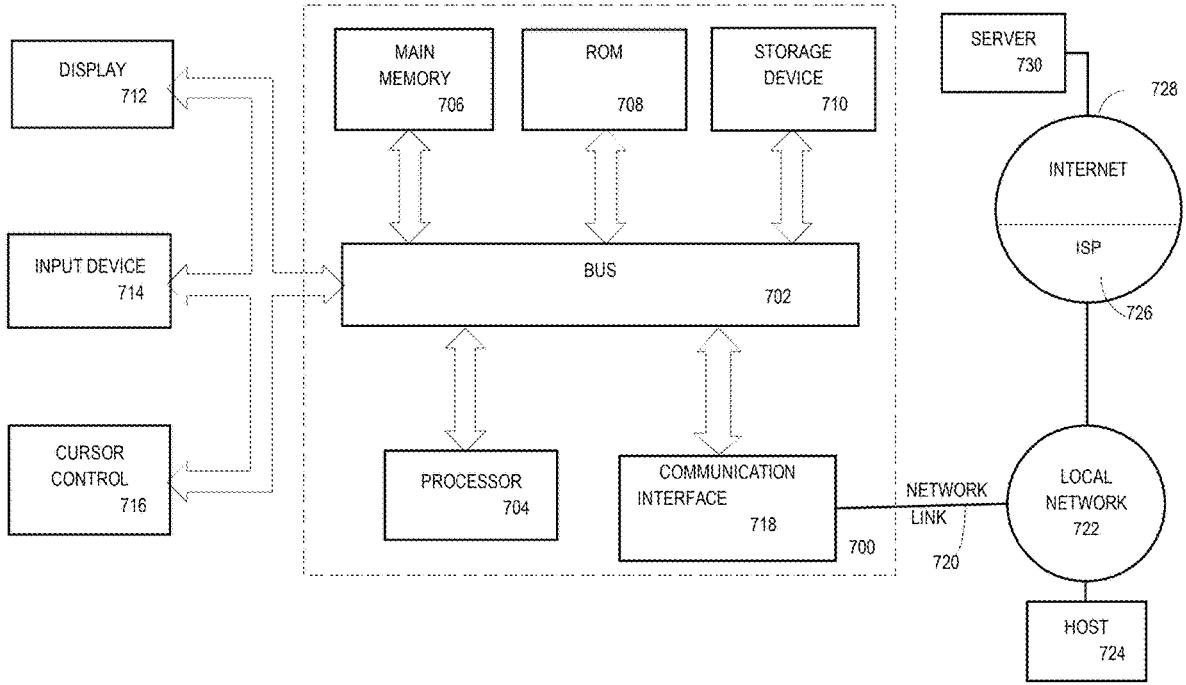
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
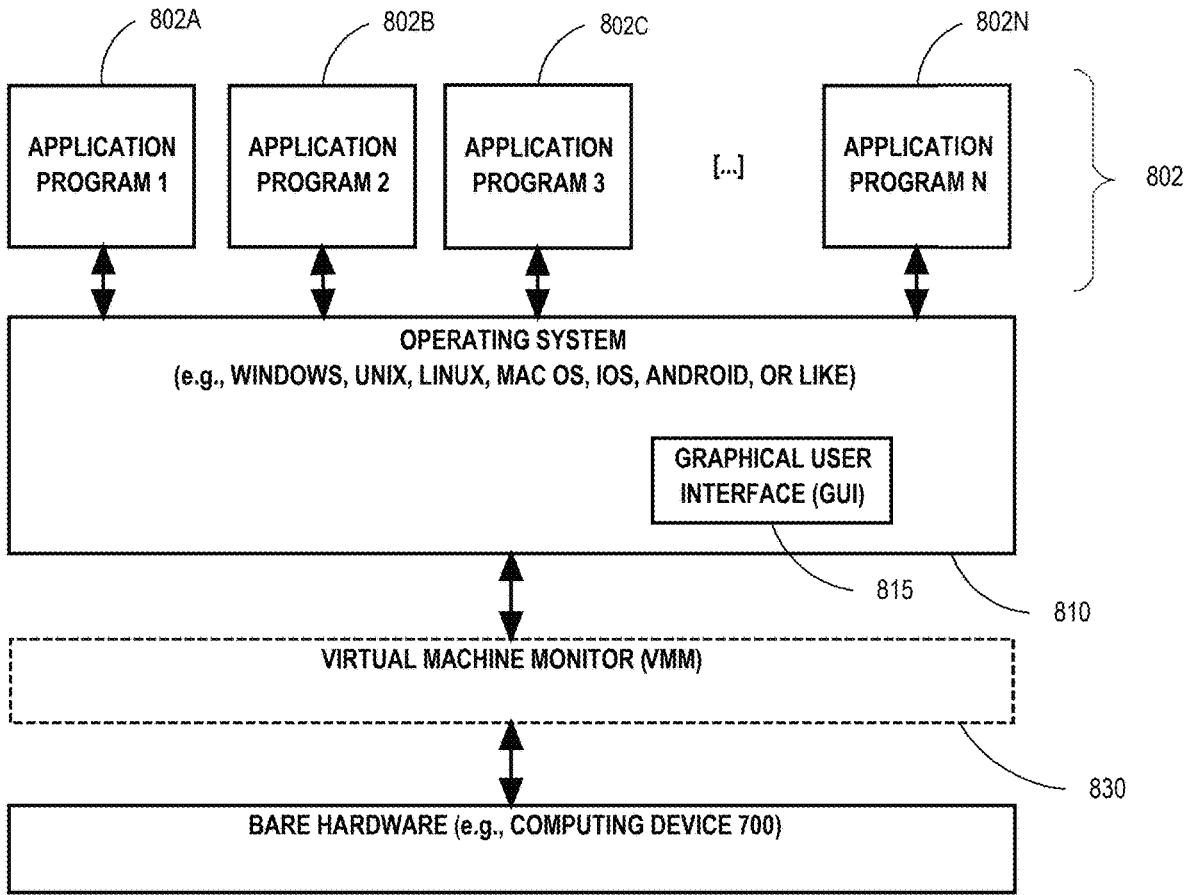
FIG. 8 is a block diagram of a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   a database management system (DBMS) storing in memory a segmented array in vector storage, wherein:
   the segmented array stores representations of a plurality of vectors from a database,
   each segment of the segmented array comprises a plurality of elements corresponding to respective vectors of the plurality of vectors,
   each element of the plurality of elements comprises a representation of a respective vector of the plurality of vectors and metadata associated with the respective vector and is indexed by a vector identifier for the respective vector, and
   the vector identifier indicates a position of the vector in the vector storage;
   constructing, in the memory, a hierarchical navigable small world (HNSW) vector index, wherein the HNSW vector index indexes the plurality of vectors; and
   performing a similarity search using the HNSW vector index,
   wherein the method is performed by one or more computing devices.

2. The method of claim 1, wherein the HNSW vector index comprises a graph comprising a plurality of layers, and individual layers of the plurality of layers comprising at least a portion of the plurality of vectors.

3. The method of claim 2, wherein constructing the HNSW vector index comprises:
   allocating the segmented array from a per-index slab allocator;
   loading the plurality of vectors and metadata associated with the plurality of vectors into the segmented array;
   allocating a plurality of data structures, wherein each of the plurality of data structures corresponds to one of the plurality of layers;
   ingesting the plurality of vectors into the plurality of data structures from the segmented array.

4. The method of claim 3, wherein each data structure of the plurality of data structures comprises a source array and a destination array, wherein:
   the destination array comprises, for individual vectors of the plurality of vectors, one or more indices of one or more respective neighboring vertices; and
   the source array comprises, for the individual vectors, a pointer to a lowest-indexed neighboring vertex of the one or more respective neighboring vertices.

5. The method of claim 4, further comprising performing an iteration over a neighbor list of a particular vector, wherein performing the iteration over the neighbor list of the particular vector comprises:
   using a pointer stored in the source array at an index corresponding to a vector identifier of the particular vector, identify a lowest-indexed element of the neighbor list;
   set a value of a current position of the iteration to zero;
   in response to determining that a vector at an index in the neighbor list corresponding to the current position is not equal to zero, and that the current position is not equal to a maximum size of the neighbor list, return a vector identifier of the vector; and
   increase the value of the current position by one.

6. The method of claim 3, wherein ingesting the plurality of vectors into the plurality of data structures from the segmented array is performed by a plurality of workers in parallel.

7. The method of claim 3, wherein ingesting the plurality of vectors into the plurality of data structures from the segmented array comprises:

performing a greedy search to identify a nearest neighbor of a new vector of the plurality of vectors in a target layer of the graph;

selecting a plurality of neighbors of the new vector in at least the target layer and a lowest layer of the graph; and inserting the new vector in at least the lowest layer and the target layer.

8. The method of claim 7, wherein performing the greedy search to identify the nearest neighbor of the new vector in the target layer comprises:

identifying a first nearest neighbor of the new vector in a highest layer of the graph;

using the first nearest neighbor as an entry point into a second layer of the graph, identifying a second nearest neighbor of the new vector in the second layer; and using the second nearest neighbor as an entry point into the target layer, identifying the nearest neighbor in the target layer.

9. The method of claim 7, wherein selecting the plurality of neighbors of the new vector in at least the target layer and the lowest layer comprises:

identifying one or more first nearest neighbors of the new vector in the target layer; and identifying one or more second nearest neighbors of the new vector in the lowest layer.

10. The method of claim 7, wherein inserting the new vector in at least the lowest layer and the target layer comprises:

creating one or more edges from the new vector to one or more first neighbors of the new vector in the lowest layer;

creating one or more edges from the one or more first neighbors to the new vector in the lowest layer;

creating one or more edges from the new vector to one or more second neighbors of the new vector in the target layer; and creating one or more edges from the one or more second neighbors to the new vector in the target layer.

11. One or more non-transitory storage media storing instructions which, when executed by one or more computing devices, cause the one or more computing devices to at least:

store in memory a segmented array in vector storage, wherein;

the segmented array stores representations of a plurality of vectors from a database, each segment of the segmented array comprises a plurality of elements corresponding to respective vectors of the plurality of vectors, each element of the plurality of elements comprises a representation of a respective vector of the plurality of vectors and metadata associated with the respective vector and is indexed by a vector identifier for the respective vector; and the vector identifier indicates a position of the vector in the vector storage;

construct, in the memory, a hierarchical navigable small world (HNSW) vector index, wherein the HNSW vector index indexes the plurality of vectors; and performing a similarity search using the HNSW vector index.

12. The one or more non-transitory storage media of claim 11, wherein the HNSW vector index comprises a graph comprising a plurality of layers, and individual layers of the plurality of layers comprising at least a portion of the plurality of vectors.

13. The one or more non-transitory storage media of claim 12, wherein constructing the HNSW vector index comprises:

allocating the segmented array from a per-index slab allocator;

loading the plurality of vectors and metadata associated with the plurality of vectors into the segmented array;

allocating a plurality of data structures, wherein each of the plurality of data structures corresponds to one of the plurality of layers;

ingesting the plurality of vectors into the plurality of data structures from the segmented array.

14. The one or more non-transitory storage media of claim 13, wherein each data structure of the plurality of data structures comprises a source array and a destination array, wherein:

the destination array comprises, for individual vectors of the plurality of vectors, one or more indices of one or more respective neighboring vertices; and the source array comprises, for the individual vectors, a pointer to a lowest-indexed neighboring vertex of the one or more respective neighboring vertices.

15. The one or more non-transitory storage media of claim 14, further comprising performing an iteration over a neighbor list of a particular vector, wherein performing the iteration over the neighbor list of the particular vector comprises:

using a pointer stored in the source array at an index corresponding to a vector identifier of the particular vector, identify a lowest-indexed element of the neighbor list;

set a value of a current position of the iteration to zero;

in response to determining that a vector at an index in the neighbor list corresponding to the current position is not equal to zero, and that the current position is not equal to a maximum size of the neighbor list, return a vector identifier of the vector; and increase the value of the current position by one.

16. The one or more non-transitory storage media of claim 13, wherein ingesting the plurality of vectors into the plurality of data structures from the segmented array is performed by a plurality of workers in parallel.

17. The one or more non-transitory storage media of claim 13, wherein ingesting the plurality of vectors into the plurality of data structures from the segmented array comprises:

performing a greedy search to identify a nearest neighbor of a new vector of the plurality of vectors in a target layer of the graph;

selecting a plurality of neighbors of the new vector in at least the target layer and a lowest layer of the graph; and inserting the new vector in at least the lowest layer and the target layer.

18. The one or more non-transitory storage media of claim 17 wherein performing the greedy search to identify the nearest neighbor of the new vector in the target layer comprises:

identifying a first nearest neighbor of the new vector in a highest layer of the graph;

using the first nearest neighbor as an entry point into a second layer of the graph, identifying a second nearest neighbor of the new vector in the second layer; and using the second nearest neighbor as an entry point into the target layer, identifying the nearest neighbor in the target layer.

19. The one or more non-transitory storage media of claim 17 wherein selecting the plurality of neighbors of the new vector in at least the target layer and the lowest layer comprises:

identifying one or more first nearest neighbors of the new vector in the target layer; and identifying one or more second nearest neighbors of the new vector in the lowest layer.

20. The one or more non-transitory storage media of claim 17, wherein inserting the new vector in at least the lowest layer and the target layer comprises:

creating one or more edges from the new vector to one or more first neighbors of the new vector in the lowest layer;

creating one or more edges from the one or more first neighbors to the new vector in the lowest layer;

creating one or more edges from the new vector to one or more second neighbors of the new vector in the target layer; and creating one or more edges from the one or more second neighbors to the new vector in the target layer.

\* \* \* \* \*